United States Patent [19]

Coppola et al.

[11] 4,312,954

[45] Jan. 26, 1982

[54] SINTERED SILICON CARBIDE CERAMIC BODY

[75] Inventors: John A. Coppola, Lewiston; Lawrence N. Hailey, Niagara Falls; Carl H. McMurtry, Youngstown, all of N.Y.

[73] Assignee: Kennecott Corporation, Stamford, Conn.

[21] Appl. No.: 584,226

[22] Filed: Jun. 5, 1975

[51] Int. Cl.³ .......................................... C04B 35/56
[52] U.S. Cl. .................................................. 501/90
[58] Field of Search ............................ 156/44; 501/90

[56] References Cited

PUBLICATIONS

Prochazka et al. "Investigation of Ceramics for High-Temperature Turbine Vanes", Final Report for Contract N62269-73-C-0356, submitted to the Naval Air Development Center by General Electric Co., Apr., 1974.

Primary Examiner—Edward J. Meros
Assistant Examiner—Mark Bell
Attorney, Agent, or Firm—William H. Holt; Raymond W. Green

[57] ABSTRACT

Pressureless sintering of silicon carbide to produce ceramic bodies having 75% and greater theoretical densities, can be accomplished by firing shaped bodies, containing finely divided silicon carbide, boron source such as boron carbide, carbon source such as phenolic resin and a temporary binder, at a sintering temperature of from about 1900° C. to about 2500° C.

45 Claims, 1 Drawing Figure

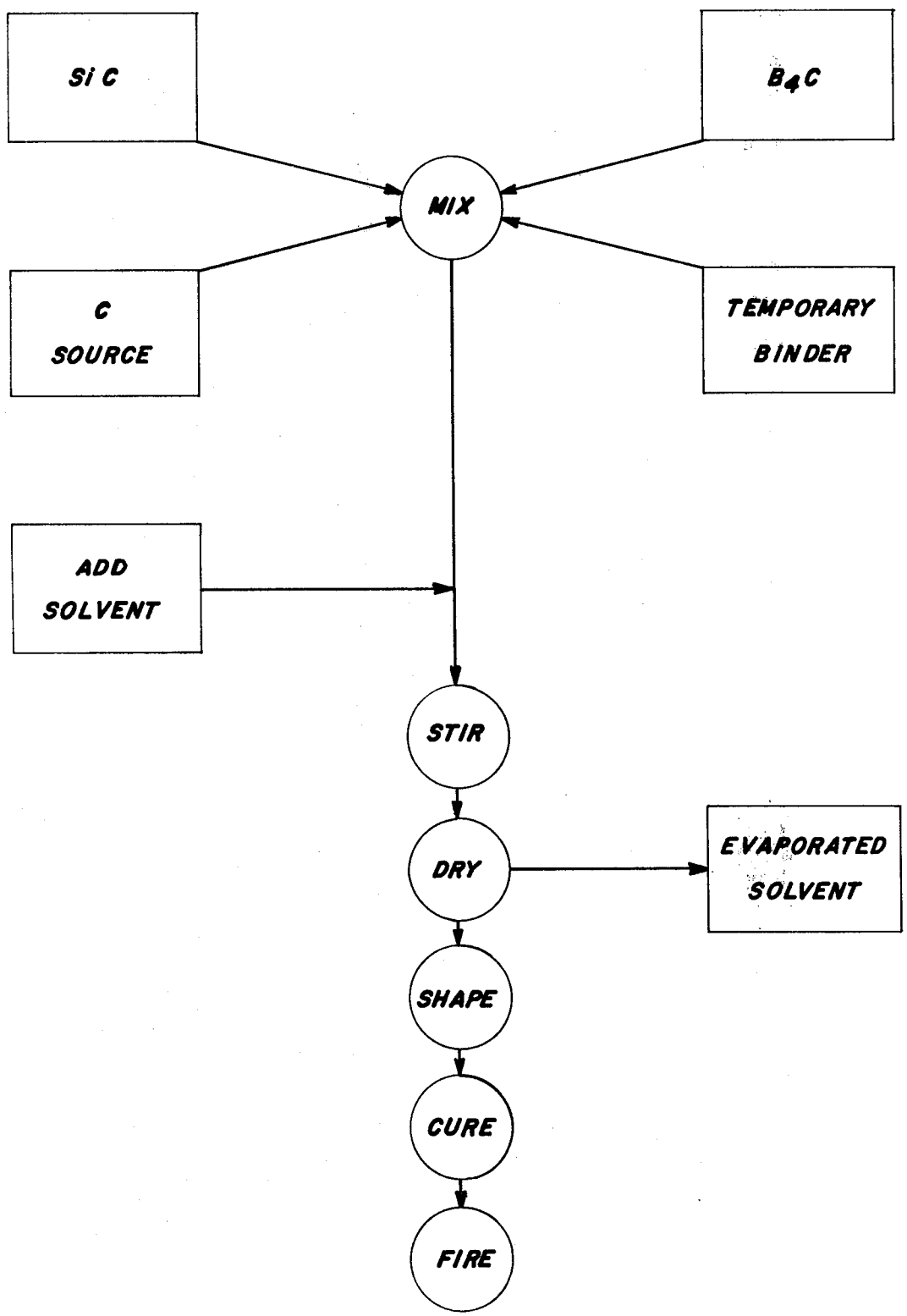

SINTERED SILICON CARBIDE CERAMIC BODY

BACKGROUND OF THE INVENTION

The chemical and physical properties of silicon carbide make it an excellent material for high temperature structural applications. These properties include good oxidation resistance and corrosion behavior, good heat transfer coefficients, low expansion coefficient, high thermal shock resistance and high strength at elevated temperature. It is in particular desirable to produce silicon carbide bodies having high density and suitable for engineering material uses, such as for example high temperature gas turbine applications. Silicon carbide is a preferred material for such use, because it can withstand greater temperature differential than conventional materials, and can therefore lead to greater efficiency in the transformation of energy.

Methods of producing high density silicon carbide bodies have heretofore included reaction bonding (also known as reaction sintering), chemical vapor deposition and hot pressing. Reaction sintering involves the use of silicon impregnants to upgrade the density of the silicon carbide and is useful for many applications, but is undesirable where excess silicon exuding from the silicon carbide body would be detrimental. Silicon carbide deposition is impractical for producing complex shapes, and hot pressing (the production of high density silicon carbide bodies by simultaneous application of heat and pressure) is impractical for some shapes, since the pressure required during the hot pressing operation deforms the silicon carbide body and requires that only relatively simple shapes can be produced by this method.

It is, therefore, an object of this invention to produce a sintered ceramic body having a high proportion of silicon carbide, and a high (greater than 75% theoretical) density. It is a further object of this invention to produce such a body which does not require the use of expensive and hard to obtain finely divided "beta" (cubic) silicon carbide, which has heretofore been regarded as a highly preferred raw material for such ceramic body, due to the previously found difficulties in obtaining sintering of mixtures containing alpha (non-cubic) silicon carbide material.

Subsidiary objects of this invention are the provision of a raw batch and a process for the production of such sintered ceramic body containing high proportion of silicon carbide and high density.

SUMMARY OF THE INVENTION

According to the first aspect of the present invention, there is provided a sintered ceramic body consisting essentially of from about 91 to about 99.35% by weight silicon carbide, from about 0.5 to about 5.0% carbonized organic material, from about 0.15 to about 3.0% boron, and up to about 1.0% additional carbon; and having a density of at least about 2.40 g/cc. According to a second aspect of the present invention, there is provided a raw batch for producing a sintered ceramic body, comprising from about 91 to about 99.35 parts by weight silicon carbide having a surface area of from about 1 to about 100 m²/g; from about 0.67 to about 20 parts by weight of a carbonizable, organic solvent soluble, organic material having a char yield of from about 25 to about 75% by weight; from about 0.15 to about 5 parts by weight of a boron source containing from about 0.15 to about 3.0 parts by weight boron; and from about 5 to about 15 parts by weight of temporary binder. According to a further aspect of this invention, there is provided a process for producing a sintered ceramic body, comprising the steps of mixing together the ingredients of the above-described raw batch; adding to the raw batch from about 25 to about 100% by weight of the raw batch of an organic solvent in which the carbonizable, organic solvent soluble, organic material is soluble; stirring the raw batch and organic solvent in such a way as to disperse the carbonizable, organic solvent soluble, organic material about the silicon carbide of the raw batch; drying the stirred mixture in such a way as to evaporate the organic solvent from the mixture; shaping the dried mixture in such a way as to produce a shaped body having a density of at least about 1.60 g/cc; curing the temporary binder within the shaped body; and firing the shaped body for such time, such temperature and in such environment as to produce a density of at least about 2.40 g/cc.

BRIEF DESCRIPTION OF THE DRAWING

The single FIGURE of drawing is a flow chart which shows the admixture of 4 raw materials to form a raw batch; the addition of solvent and subsequent processing step to disperse the carbon source about the silicon carbide of the raw batch; and the subsequent processing steps to produce the sintered ceramic body o the present invention.

DETAILED DESCRIPTION

The theoretical density of silicon carbide is 3.21 g/cc. The preferred minimum density of about 2.40 g/cc for sintered ceramic bodies according to the present invention corresponds, therefore, to about 75% of theoretical density, a density factor which has been previously difficult if not impossible to obtain without the use of beta silicon carbide powders. The beta powders, however, are more difficult to obtain, and are more expensive, than the more common alpha (non-cubic) crystalline forms, or the amorphous (non-crystalline) form. It has been found that the process of the present invention is essentially immune to changes in crystallinity of the silicon carbide powder starting material, unlike various pressureless sintering and hot pressing processes of the prior art. Indeed, according to the present invention, sintered ceramic bodies wherein the silicon carbide consists essentially of alpha, non-cubic silicon carbide and which have densities in excess of about 2.90 g/cc (corresponding to 90% theoretical density of silicon carbide) are easily obtained. It is not by any means, however, necessary that the silicon carbide consist essentially of alpha non-cubic silicon carbide, although this is preferred. It has indeed been shown to be possible, in accordance with the present invention, to produce sintered ceramic vodies in which the silicon carbide is predominantly (more than 50%) alpha, non-cubic silicon carbide. Indeed, various mixtures of alpha and beta crystalline material, containing at least 5% alpha, non-cubic silicon carbide, have been shown to be operable for use in the present invention. Various amounts of amorphous non-crystalline silicon carbide powders can also be used. The process of the present invention does not produce any substantial amount of phase transformation, so that the crystalline habit of the silicon carbide in the starting material will be in essentially the same proportions as the crystalline habit of the finished sintered ceramic body.

As noted above, the minimum preferred density for sintered ceramic bodies according to the present invention is about 2.40 g/cc (75% theoretical). Such bodies can be used "as is" for some applications, or they may be machined at the more manageable density of 2.40 or thereabouts, and later subjected to further firing to produce further densitification of the sintered ceramic bodies. For use as turbine blades and many other high temperature applications, it is preferred that the density be at least about 3.05 g/cc (95% of theoretical). Such density is readily obtainable in accordance with the present invention.

The preferred composition of the sintered ceramic body in accordance with the present invention consists essentially of from about 91 to about 99.35% by weight silicon carbide, from about 0.5 to about 5.0% carbonized organic material, from about 0.15 to about 3.0% boron, and up to about 1.0% additional carbon. All percentages herein are by weight, unless otherwise specified. Within this broad composition, it is preferred that the sintered ceramic body contain from about 0.5 to about 4% carbonized organic material, from about 0.18 to about 0.36% boron, about 0.05 to about 0.10% additional carbon, with the balance of the composition being silicon carbide. In particular, it is preferred that the sintered ceramic body contain about 2% carbonized organic material, about 0.36% boron, and about 0.1% additional carbon. This is the composition which results from practicing the process of the present invention in accordance with the best mode now contemplated. Within the broad range of ingredients specified, the density obtained appears to have relatively little correlation to ingredients, but is rather a function of firing conditions, particularly the temperature and time of firing.

The sintered ceramic body should contain from about 0.15 to about 3.0% boron. In so specifying the boron content, it is not intended to limit the form in which the boron may be present (i.e., whether elemental boron or combined in boron compounds such as boron carbide). Indeed, it is believed that in most cases the boron will be present as a boron carbide material in the finished sintered ceramic body. The "additional carbon" broadly specified as being present in an amount up to about 1.0% is thus an optional ingredient of the finished sintered ceramic body, as the amount of such additional carbon (i.e., carbon other than that of the silicon carbide or that which is present as carbonized organic material) will depend on the carbon associated with the boron which was present in the raw batch mixture from which the sintered ceramic body was made.

The amount of carbon which is present as carbonized organic material will depend on the amount of such organic material which was added to the raw batch, and the char yield (carbon content) of the organic material.

The raw batch for producing the sintered ceramic body in accordance with the present invention comprises from about 91 to about 99.35 parts by weight silicon carbide having a surface area of from about 1 to about 100 m$^2$/g. Such silicon carbide powders are usually less than 20 microns in particle size, more particularly less than 10 microns in particle size; and in particular sub-micron size particles are generally preferred. It is difficult, however, to obtain accurate particle size distributions for silicon carbide powders having size much less than 1 micron in particle size, and the surface area of the silicon carbide particle is the more relevant consideration in determining suitable material. Accordingly, the preferred silicon carbide particles for use in the process of the present invention to produce the sintered ceramic bodies of the present invention are specified as having from about 1 to about 100 m$^2$/g surface area. Within this range, it is more preferred that the surface area of the silicon carbide particles range between about 5 and 50 m$^2$/g; and within this range, surface areas between about 7 and about 15 m$^2$/g have been found to be easily obtainable and quite useful for producing sintered ceramic bodies of the present invention.

The silicon carbide starting material can be obtained from any of a variety of sources. Vapor phase reacted material is produced in fine particle size, and can be used if desired. Larger material can be ball milled until sufficient amounts of fine silicon carbide are obtained, and the proper size of silicon carbide can be selected from the ball milled product by conventional means, such as water sedimentation.

The crystalline habit of the silicon carbide starting material in the raw batch is essentially non-critical. Alpha, non-cubic silicon carbide is more readily available than beta silicon carbide, and therefore the preferred starting material contains silicon carbide which consists essentially of alpha, non-cubic crystalline silicon carbide. It is quite acceptable, however, to use silicon carbide which has been made by a process which produces mixtures of alpha and beta silicon carbide, and the next most preferred starting material is silicon carbide which is predominantly alpha, non-cubic crystalline silicon carbide. It has also been shown to be operable to use raw batches wherein the silicon carbide comprises at least 5% alpha, non-cubic crystalline silicon carbide, and amorphous silicon carbide can also be used. It is even possible to use high purity beta silicon carbide starting material, but such material is not preferred because of the high expense of obtaining high purity beta silicon carbide powders.

In any event, it is preferred that the silicon carbide material shall have been treated with acid (such as hydrofluoric and/or nitric acids, particularly mixtures of hydrofluoric and nitric acids) to remove extraneous materials which may interfere with the sintering operation.

One of the more important features of the raw batch of the present invention is the carbonizable, organic solvent soluble, organic material. It has been found desirable that this material be organic and organic solvent soluble in order that it be easily dispersable about the silicon carbide particle of th raw batch, in order to provide an intimate availability of carbonized organic material upon firing of the shaped body produced from the raw batch. It has been found desirable that the sintered ceramic body contain from about 0.5 to about 5.0% of carbonized organic material, with the result that if the carbonizable, organic solvent soluble, organic material has a char yield of from about 25 to about 75% by weight, as is preferred, there should be present from about 0.67 to about 20 parts by weight of carbonizable, organic solvent soluble, organic material in the raw batch. Within the range of from about 25 to about 75% by weight char yield, it is preferred that the organic material have from about 33 to about 50% by weight, more particularly from about 40 to about 45% by weight, char yield. If the char yield is between about 33 and about 50% by weight, the amount of carbonizable, orgaic solvent soluble, organic material should range between about 1 and 12% by weight to produce the preferred amount of carbonized organic material from about 0.5 to about 4.0% by weight in the finished sintered ceramic body. The most preferred amount of carbonized organic material in the sintered ceramic body is believed to be about 2% by weight, so that the optimum raw batch should contain about 5% by weight of an organic solvent soluble, organic material having a char yield between about 40 and 45% by weight. Particularly preferred carbonizable, organic solvent soluble, organic materials are phenolic resin and coal tar pitch, which have char yields of from about 40 to about 42% and on the order of 60%, respectively. As between the phenolic resin and coal tar pitch, the phenolic resin is more definitely preferred, and particularly a B-stage resole phenolic resin has been found to be particularly useful in the present invention.

The boron can be added to the raw batch as either elemental boron or as boron carbide. Boron carbide is essentially a non-stoichiometric material, and various boron carbide materials having a molar ratio of boron to carbide between 8:1 and 2:1 have been reported. It is in general preferred to use boron carbide as the boron source, and in particularly boron carbide which is so-called "solid state reacted boron carbide" with a molar ratio of boron to carbon between about 3.5:1 and 4.1:1. Such boron carbide can be produced in accordance with the process of U.S. Pat. No. 3,379,647, P. A. Smudski. The process of the above Smudski patent is found to produce boron carbides having such a molar ratio, and such a molar ratio is preferred because with the higher boron to carbon ratio, the boron carbide either takes carbon or gives boron to the surrounding chemical species, which is desirable in the present instance as it promotes the desired densification during the firing step of the process of the present invention. boron carbide materials having greater ratios of boron to carbide are even more chemically active than the material having a ratio of about 4.1:1 to about 3.5:1, but such materials are relatively less available and more expensive, and therefore are not preferred for that reason.

The amount of boron source to be added to the raw batch depends on the boron content of the boron source and the amount of boron to be present in the final sintered ceramic body. The sintered ceramic body should contain from about 0.15 to about 3.0% boron, and in particular from about 0.18 to about 0.36% boron is present in the most successfully densified bodies produced in accordance with the present invention. 0.36% is the optimum boron content of the sintered ceramic body. The amount of boron source should thus be chosen accordingly. Thus, if the boron source is elemental boron, it should be present in the raw batch from about 0.18 to about 0.36 parts by weight to yield a sintered ceramic body having from about 0.18 to about 0.36% by weight boron. For the preferred solid state reacted boron carbide with a molar ratio of boron to carbon between about 3.5:1 and about 4.1:1, the boron carbide should be present in an amount from about 0.23 to about 0.46 parts by weight to produce such an amount of boron in the finished sintered ceramic body.

In any event, the oron source can be crystalline or non-crystalline, and preferably is particulate and of a size less than 30 microns. Within this limitation, it is preferred that the source be of a size ranging from about 0.1 to about 10 microns.

The temporary binder is preferably polyvinyl alcohol having associated therewith from about 5 to about 15 parts by weight water, per part of polyvinyl alcohol, as a temporary binder vehicle. In particular, it is preferred to use 10 parts by weight polyvinyl alcohol plus about 90 parts by weight water as a temporary binder vehicle. In addition to polyvinyl alcohol, however, other temporary binders can be used, such as coal tar pitch, long chain fatty material (for example "CARBOWAX" wax), metallic stearates such as aluminum stearates and zinc stearates, sugars, starches, alginates, and polymethyl phenylene. Many of these materials are, of course, capable as functioning as the carbonizable, organic solvent soluble, organic material which is added in sufficient quantity to yield the appropriate amount of carbonized organic material in the finished sintered ceramic body. A single material can thus serve two functions in the raw batch.

The process for producing the sintered ceramic body according to the present invention preferably begins with the mixing together of the ingredients of the raw batch, namely from about 91 to about 99.35 parts by weight silicon carbide; from about 0.67 to about 20 parts by weight of the carbonizable organic material; from about 0.15 to about 5% by weight of the boron source; and from about 5 to about 15 parts by weight of temporary binder. If the temporary binder is polyvinyl alcohol including a quantity of water as temporary binder vehicle, this first mixing step preferably includes stirring the powdered materials (silicon carbide, organic material and boron source) together with the temporary binder and temporary binder vehicle, prior to adding an organic solvent in which the organic material is soluble. In any event, after the organic solvent is added, the raw batch and organic solvent should be stirred in such a way as to disperse the carbonizable, organic solvent soluble, organic material about the silicon carbide of the raw batch, suitably for at least about 5 minutes, and preferably about 15 minutes. After the raw batch and organic solvent have been stirred so as to disperse the organic material about the silicon carbide, the stirred mixture is dried by any suitable technique, such as passing a quantity of drying gas near the stirred mixture, or by spray-drying the mixture. Following this drying step, the dried mixture is shaped in such a way as to produce a shaped body preferably having a density of at least about 1.60 g/cc. This shaping can be accomplished by any of a variety of techniques which are in themselves known, for example by extrusion, injection molding, transfer molding, casting, cold pressing, isostatic pressing, or by compression. If compression is used, preferred pressures are between about 4,000 and about 100,000 psi, with between about 16,000 and about 20,000 psi being preferred. If the temporary binder is polyvinyl alcohol, the next step of curing the temporary binder can be preferably accomplished by heating the shaped body at a temperature about 90° to about 100° C. for about 1 to about 2 hours. The shaped body is then fired to accomplish the densification necessary to produce the sintered ceramic body of the invention. Firing takes from about 20 to about 60 minutes at temperatures of from about 1900° to about 2500° C. Lower temperatures are in general inoperable, and higher temperatures may cause a sublimation of the silicon carbide material. The firing step can be carried out in a conventional tube furnace wherein the shaped body is passed through the hot zone of the tube furnace to have a residence time at the desired temperature and for the desired time. Details of such tube furnaces are known in the prior art, and are described for example in P. A. Smudski, U.S. Pat. No. 3,689,220. The firing step accomplishes a "pressureless sintering", referred to herein for simplicity merely as "sintering". By "sintering" or "pressureless sintering" it is meant that no mechanical pressure is applied to the object being fired or sintered to enhance the reaction. Instead, the object being sintered is surrounded, usually in an inert container such as a graphite crucible, in up to about 1 atmosphere of pressure of an inert gas, a reducing gas, a vacuum, or nitrogen. Reducing gases include hydrogen, carbond dioxide and carbon monoxide; inert gases include argon, helium, and neon. The gases in which the sintering operation can be carried out thus include argon, carbon dioxide, carbon monoxide, helium, hydrogen, neon and nitrogen. Although nitrogen enters into reaction in a minor degree with the silicon carbide raw material, it does so in sufficiently minor degree that the composition of the sintered ceramic body is not noticeably changed. The use of nitrogen, however, does raise the necessary sintering temperature about 200° C., so that if nitrogen is the surrounding atmosphere, the preferred sintering temperature is from about 2260° to about 2300° C. In the other gases, particularly inert gases such as argon, helium or neon, the preferred sintering temperature is from about 2060° to about 2100° C.

The firing can also be carried out under vacuum, i.e., without any surrounding atmosphere. By "vacuum" is meant a practical vacuum, i.e., 1.0 mmHg or less.

The invention will now be illustrated with several examples.

EXAMPLE 1

The raw materials mixed together for the raw batch of this example were sub-micron alpha silicon carbide, solid state reacted boron carbide (B:C=4.08:1), B-stage resole phenolic resin identified by Varcum Chemical Company as Resin 8121, and polyvinyl alcohol in water. The silicon carbide has a surface area between about 7 and 15 $m^2/g$; 9.764 grams were used. Particulate boron carbide having a size less than 10 microns, containing 0.036 grams boron, was used. The silicon carbide and boron carbide and 0.5883 grams phenolic resin were placed in a 4-ounce bottle. One gram of a 10% polyvinyl alcohol-water solution were added and the ingredients were mixed together for 15 minutes. Twenty milliliters of acetone, a solvent for the organic phenolic resin, was added and the mixture again stirred for 15 additional minutes. Nitrogen was passed into the container gently so as to evaporate the acetone and water from the mixture, leaving a powder which was dry to the touch. The mix was occasionally stirred during evaporation, which was continued for 1 half hour. When the mix reached a putty-like consistency it was stirred continuously until the mix began to break up into fine particles. When there was only a faint trace of acetone smell and the material was dry to the touch, the mix was judged ready for shaping into a body for curing and firing. A portion of the powder was compressed at 16,000 psi. After pressing the temporary binder was cured at 100° C. for a time between 1 and 2 hours. After curing the density was found to be 1.78 g/cc. The cured piece was placed on a graphite setter and then placed in a closed graphite crucible. The crucible was fed into a tube furnace having a hot zone maintained at 2080° C., at a rate of about 2¾" per minute, so that it required about 20 minutes to traverse the 54 inches to the hot zone. Argon was passed through the tube furnace during this time at about 1 atmosphere of pressure (zero gauge pressure). The cured body was held in the hot zone of 2080° C. for 45 minutes, and held for about 20 minutes in a cooling chamber to avoid thermal stock. After the body had cooled, the density was again checked and the sintered ceramic body was found to have a density of 2.75 g/cc, about 86% of the theoretical 3.21 g/cc density.

EXAMPLES 2–16

Example 1 was repeated with various silicon carbide samples. The results for Examples 1–16 are tabulated in Table 1.

EXAMPLES 17–20

CONTROL EXPERIMENTS 1 AND 2

Example 1 was again repeated, varying the atmospheres (or lack of atmosphere) and firing temperature. Results are set forth in Table 2.

EXAMPLES 21–35

CONTROL EXPERIMENTS 3 AND 4

Example 1 was again repeated in each case changing one variable. The results are set forth in Table 3.

TABLE 1

| EXAMPLE | SURFACE AREA ($m^2/g$) | "GREEN" DENSITY (g/cc) | SINTERED DENSITY (g/cc) | APPROXIMATE SINTERED PERCENT THEORETICAL DENSITY |
|---|---|---|---|---|
| 1 | 13.2–14 | 1.78 | 2.75 | 86 |
| 2 | 13.2–14 | 1.72 | 2.86 | 89 |
| 3 | 13.2–14 | 1.71 | 2.82 | 88 |
| 4 | 13.5 | 1.71 | 2.72 | 85 |
| 5 | 13.5 | 1.72 | 2.71 | 85 |
| 6 | 13.5 | 1.71 | 2.73 | 85 |
| 7 | 13.2 | 1.70 | 3.07 | 96 |
| 8 | 13.2 | 1.70 | 3.05 | 95 |
| 9 | 13.5 | 1.69 | 2.62 | 82 |
| 10 | 9.5 | 1.84 | 3.09 | 96 |
| 11 | 9.5 | 1.81 | 3.05 | 95 |
| 12 | 9.5 | 1.87 | 3.08 | 96 |
| 13 | 9.5 | 1.80 | 2.98 | 93 |
| 14 | 13.5 | 1.82 | 2.90 | 90 |
| 15 | 7 | 1.83 | 2.59 | 81 |
| 16 | 9.5 | 1.80 | 3.00 | 93 |

TABLE 2

| EXAMPLE | ATMOSPHERE | TEMPERATURE °C. | SURFACE AREA ($m^2/g$) | "GREEN" DENSITY (g/cc) | SINTERED DENSITY (g/cc) | APPROXIMATE SINTERED PERCENT THEORETICAL DENSITY |
|---|---|---|---|---|---|---|
| 17 | Nitrogen | 2280 | 13.2 | 1.67 | 3.08 | 96 |
| 18 | Nitrogen | 2280 | 9.5 | 1.79 | 2.50 | 78 |
| 19 | Vacuum | 2080 | 9.5 | 1.79 | 2.76 | 86 |
| 20 | Vacuum | 1900 | 9.5 | 1.80 | 2.40 | 75 |
| CONTROL 1 | Nitrogen | 2080 | 9.5 | 1.85 | 1.84 | 57 |
| CONTROL 2 | Nitrogen | 2080 | 9.5 | 1.78 | 1.84 | 57 |

TABLE 3

| EXAMPLE | SURFACE AREA, $m^2/g$ | VARIED ITEM | "GREEN" DENSITY, g/cc | SINTERED DENSITY, g/cc | APPROXIMATE SINTERED PERCENT THEORETICAL DENSITY |
|---|---|---|---|---|---|
| 21 | 9.5 | B source is arc furnaced 1000 grit $B_4C$ | 1.83 | 3.06 | 95 |
| 22 | 9.5 | B source is amorphous elemental boron | 1.84 | 2.94 | 92 |
| 23 | 9.5 | B source decreased to yield 0.18% boron | 1.87 | 2.99 | 93 |
| 24 | 9.5 | B source increased to yield 0.72% boron | 1.89 | 2.84 | 88 |
| 25 | 9.5 | C source increased to yield 3% carbon | 1.77 | 3.05 | 95 |
| 26 | 7 | C source increased to yield 3% carbon | 1.76 | 2.48 | 77 |
| 27 | 9.5 | C source increased to yield 4% carbon | 1.95 | 2.97 | 93 |
| 28 | 9.5 | C source is coal tar pitch | 1.78 | 2.44 | 76 |
| 29 | 9.5 | Firing time is 30 minutes | 1.90 | 2.86 | 89 |
| 30 | 9.5 | Firing time is 20 minutes | 1.91 | 2.81 | 88 |
| 31 | 9.5* | SiC is 5% beta, 95% alpha | 1.86 | 3.07 | 96 |
| 32 | 9.5* | SiC is 25% beta, 75% alpha | 1.86 | 3.07 | 96 |
| 33 | 9.5* | SiC is 50% beta, 50% alpha | 1.86 | 3.05 | 95 |
| 34 | 9.5* | SiC is 75% beta, 25% alpha | 1.87 | 3.03 | 94 |
| 35 | 9.5* | SiC is 95% beta, 5% alpha | 1.87 | 2.94 | 92 |
| CONTROL 3 | 9.5 | Boron source absent | 1.86 | 2.11 | 66 |
| CONTROL 4 | 9.5 | Carbon source absent | 1.72 | 2.11 | 66 |

*Value is for alpha material; beta is about 6 $m^2/g$.

We claim:
1. A pressureless sintered ceramic body consisting essentially of:
   (a) from about 91 to about 99.35% by weight silicon carbide, the silicon carbide comprising at least about 5% by weight of alpha, non-cubic crystalline silicon carbide;
   (b) from about 0.5 to about 5.0% uncombined carbon;
   (c) from about 0.15 to about 3.0% boron; and
   (d) up to about 1.0% additional carbon; and having a density of at least about 3.05 g/cc.

2. A sintered ceramic body according to claim 1, containing from about 0.5 to about 4% by weight uncombined carbon; from about 0.18 to about 0.36% by weight boron; and from about 0.05 to about 0.10% by weight additional carbon, the balance being silicon carbide.

3. A sintered ceramic body according to claim 1, comprising about 2% uncombined carbon, about 0.36% boron, about 0.1% additional carbon, the balance being silicon carbide.

4. A sintered ceramic body according to claim 1, wherein the silicon carbide consists essentially of alpha, non-cubic crystalline silicon carbide.

5. A sintered ceramic body according to claim 1, wherein the silicon carbide is predominantly alpha, non-cubic crystalline silicon carbide.

6. A raw batch for producing a sintered ceramic body, comprising:
   (a) from about 91 to about 99.35 parts by weight silicon carbide having a surface area of from about 1 to about 100 m2/g, the silicon carbide comprising at least about 5% by weight of alpha, non-cubic crystalline silicon carbide;
   (b) from about 0.67 to about 20 parts by weight of a organic solvent soluble, organic material, carbonizable to provide uncombined carbon and having a carbon content of from about 25 to about 75% by weight;
   (c) from about 0.15 to about 5 parts by weight of a boron source containing from about 0.15 to about 3.0 parts by weight boron; and
   (d) from about 5 to about 15 parts by weight of temporary binder.

7. A raw batch according to claim 6, wherein the silicon carbide consists essentially of alpha, non-cubic crystalline silicon carbide.

8. A raw batch according to claim 6, wherein the silicon carbide is predominantly alpha, non-cubic crystalline silicon carbide.

9. A raw batch according to claim 6, wherein the surface area of the silicon carbide ranges between about 5 and about 50 $m^2/g$.

10. A raw batch according to claim 6, wherein the surface area of the silicon carbide ranges between about 7 and about 15 $m^2/g$.

11. A raw batch according to claim 6, wherein the organic solvent soluble, organic material, carbonizable to provide uncombined carbon, has a carbon content between about 33 and about 50% by weight.

12. A raw batch according to claim 6, wherein the organic solvent soluble, organic material, carbonizable to provide uncombined carbon, has a carbon content between about 40 and 45% by weight.

13. A raw batch according to claim 6, wherein the organic solvent soluble, organic material, carbonizable to provide uncombined carbon, is selected from the group consisting of phenolic resin and coal tar pitch.

14. A raw batch according to claim 13, wherein the organic solvent soluble, organic material, carbonizable to provide uncombined carbon, is a B-stage resole phenolic resin.

15. A raw batch according to claim 11, wherein the organic solvent soluble, organic material, carbonizable to provide uncombined carbon, is present in an amount ranging from between about 1 and about 12% by weight.

16. A raw batch according to claim 12, wherein the organic solvent soluble, organic material, carbonizable to provide uncombined carbon, is present in an amount of about 5% by weight.

17. A raw batch according to claim 6, wherein the boron source is elemental boron.

18. A raw batch according to claim 17, wherein the elemental boron source is present in an amount of from about 0.18 to about 0.36 parts by weight.

19. A raw batch according to claim 6, wherein the boron source is boron carbide with a molar ratio of boron to carbon between 8:1 and 2:1.

20. A raw batch according to claim 6, wherein the boron source is solid state reacted boron carbide with a molar ratio of boron to carbon between about 3.5:1 and about 4.1:1.

21. A raw batch according to claim 20, wherein the boron carbide is present in an amount of from about 0.23 to about 0.46 parts by weight.

22. A raw batch according to claim 6, wherein the boron source is particulate and of a size less than 30 microns.

23. A raw batch according to claim 6, wherein the boron source is particulate and of a size ranging from about 0.1 to about 10 microns.

24. A raw batch according to claim 6, wherein the temporary binder is selected from the group consisting of polyvinyl alcohol, coal tar pitch, long chain fatty material, metallic stearates, sugars, starches, alginates, and polymethyl phenylene.

25. A raw batch according to claim 6, wherein the temporary binder is polyvinyl alcohol having associated therewith from about 5 to about 15 parts by weight water, per part of polyvinyl alcohol, as a temporary binder vehicle.

26. A raw batch according to claim 25, wherein the polyvinyl alcohol is present in an amount of about 10 parts by weight, and has associated therewith about 90 parts by weight of water as a temporary binder vehicle.

27. A raw batch for producing a sintered ceramic body, comprising:
(a) from about 91 to about 99.35 parts by weight silicon carbide having a surface area of from about 1 to about 100 m2/g, the silicon carbide comprising amorphous silicon carbide;
(b) from about 0.67 to about 20 parts by weight of a organic solvent soluble, organic material, carbonizable to provide uncombined carbon and having a carbon content of from about 25 to about 75% by weight;
(c) from about 0.15 to about 5 parts by weight of a boron source containing from about 0.15 to about 3.0 parts by weight boron; and
(d) from about 5 to about 15 parts by weight of temporary binder.

28. A raw batch according to claim 27, wherein the silicon carbide consists essentially of amorphous silicon carbide.

29. A sintered ceramic body according to claim 1, containing at least 2% by weight of uncombined carbon.

30. A sintered ceramic body according to claim 1, wherein the silicon carbide comprises at least about 25% by weight of alpha, non-cubic crystalline silicon carbide.

31. A sintered ceramic body according to claim 4, containing at least 2% by weight of uncombined carbon.

32. A sintered ceramic body according to claim 5, containing at least 2% by weight of uncombined carbon.

33. A pressureless sintered ceramic body characterized by a density of at least 2.90 g/cc produced by pressureless sintering, at a temperature of from about 1900° C. to about 2500° C., a pre-shaped object having a density before pressureless sintering of at least about 1.60 g/cc, the pre-shaped object comprising:
(a) from about 91 to about 99.35 parts by weight silicon carbide having a surface area of from about 1 to about 100 m2/g, the silicon carbide comprising at least about 5% by weight of alpha, non-cubic crystalline silicon carbide;
(b) from about 0.67 to about 20 parts by weight of an organic solvent soluble, organic material, carbonizable to provide uncombined carbon, having a carbon content of from about 25 to about 75% by weight;
(c) from about 0.15 to about 5 parts by weight of a boron source containing from about 0.15 to about 3.0 parts by weight boron; and
(d) from about 5 to about 15 parts by weight of temporary binder.

34. A sintered ceramic body according to claim 33, wherein the silicon carbide of the pre-shaped object comprises at least about 25% by weight of alpha, non-cubic crystalline silicon carbide.

35. A sintered ceramic body according to claim 33, wherein the silicon carbide of the pre-shaped object is predominantly by weight alpha, non-cubic crystalline silicon carbide.

36. A sintered ceramic body according to claim 33, wherein the silicon carbide of the pre-shaped object consists essentially of alpha, non-cubic crystalline silicon carbide.

37. A sintered ceramic body according to claim 33, containing at least 2% by weight of uncombined carbon.

38. A sintered ceramic body according to claim 33, having a density of at least about 3.05 g/cc.

39. A sintered ceramic body according to claim 38, wherein the silicon carbide of the pre-shaped object comprises at least about 25% by weight of alpha, non-cubic crystalline silicon carbide.

40. A sintered ceramic body according to claim 38, wherein the silicon carbide of the pre-shaped object is predominantly by weight alpha, non-cubic crystalline silicon carbide.

41. A sintered ceramic body according to claim 38, wherein the silicon carbide of the pre-shaped object consists essentially of alpha, non-cubic crystalline silicone carbide.

42. A sintered ceramic body according to claim 38, containing at least 2% by weight of uncombined carbon.

43. A pressureless body having a density of at least 95% of the theoretical density for silicon carbide consisting essentially of (a) at least 5% by weight of alpha silicon carbide and not more than 95% by weight of beta silicon carbide; (b) 0.3% to about 3% by weight boron and (c) about 0.5% to 1% by weight carbon in the form of carbonized organic material.

44. A sintered body according to claim 43, wherein the silicon carbide present is predominately alpha silicon carbide.

45. A sintered body according to claim 43, wherein the silicon carbide present consists essentially of alpha silicon carbide.

* * * * *